United States Patent [19]

Tsuchida

[11] Patent Number: 5,191,479
[45] Date of Patent: Mar. 2, 1993

[54] FRESNEL LENS

[75] Inventor: Michiro Tsuchida, Yokohama, Japan

[73] Assignee: Nipox Kabushiki Kaisha, Yokohama, Japan

[21] Appl. No.: 765,442

[22] Filed: Sep. 25, 1991

[30] Foreign Application Priority Data

Mar. 28, 1991 [JP] Japan .................................. 3-64122

[51] Int. Cl.⁵ .............................................. G02B 3/08
[52] U.S. Cl. .................................................. 359/742
[58] Field of Search ......................................... 359/742

[56] References Cited

U.S. PATENT DOCUMENTS 3,628,854 12/1971 Jampolsky ............................ 359/742
3,982,822 9/1976 Conder et al. ....................... 359/742
4,530,736 7/1985 Mutter .
4,737,447 4/1988 Suzuki et al. .
4,904,063 2/1990 Okada et al. .

Primary Examiner—Carolyn E. Fields
Attorney, Agent, or Firm—Nikolay Parada

[57] ABSTRACT

A Fresnel lens in use for a projector lens comprising a glass plate, a Fresnel lens body integrally formed on one surface of the glass plate, and a reflective layer formed on an annularly grooved surface of the lens body. The present invention provides a Fresnel lens, fabricated with a low cost, having sufficient hardness as a document support and free from any of ghost images or image distortions when used in a projector.

10 Claims, 4 Drawing Sheets

FRESNEL LENS

BACKGROUND OF THE INVENTION

1. Field of the Invention

The present invention relates to a Fresnel lens comprising a glass plate, a Fresnel lens body integrally formed on one surface of said glass plate, and a reflective layer formed on an annularly grooved surface of said lens body. The grooved surface serves as a non-spherical light converging reflector with reduced lens material instead of using a thick and bulk lens.

2. Brief Description of the Prior Art

A conventional Fresnel lens is shown in each of FIGS. 9 and 11. The Fresnel lens $L_6$ shown in FIG. 9 includes a Fresnel lens body 31 of a plastic material with a reflective layer 33 formed on an annularly grooved surface 32, and a hard coating layer 34 provided on the opposite surface of the annularly grooved surface 32.

The Fresnel lens $L_6$ is fabricated through the following steps. In a Fresnel lens mold 35, a plastic resin plate material P1 is placed. After being softened, the upper mold 37 is lowered and the plate material P1 is press-formed. After being cooled, the press-formed Fresnel lens body 31 is derived from the mold 35. On the annularly grooved surface 32, aluminum or the like is sputtered to form a reflective surface 33. Finally, a hard coating layer 34 is formed on the opposite surface of the annularly grooved surface 32.

FIG. 11 shows another Fresnel lens $L_7$, in which a Fresnel lens body 39 of a photo-curing resin is integrally formed on a surface of a plastic plate 38. Then, a reflective layer 41 on an annularly grooved surface 40 and a hard coating layer 42 on the opposite surface of the plastic plate 38 are formed.

The Fresnel lens $L_7$ is fabricated through the following steps. As shown in FIG. 12, a photo-curing resin layer is formed on a transfer surface 43 of the annularly grooved surface 40 of Fresnel lens body 39, and a plastic plate 38 is placed thereon. After hardening of the photo-curing layer by illuminating ultra-violet ray, the lens body 39 formed as an integral member with the plastic plate 38 is taken out from Fresnel mold 44. The reflective layer 41 is formed on annularly grooved surface 40. Finally, the hard coating layer 42 is formed on the opposite surface of the plastic plate 38.

SUMMARY OF THE INVENTION

The Fresnel lens of the present invention includes a Fresnel lens body of a photocuring or thermosetting resin formed integrally on a glass or aluminum plate, or a glass plate is integrally formed with a lens body, fabricated with a reduced cost, having sufficient hardness for use as a document support, and free from any ghost images when used for a projector lens.

An object of the present invention is to provide a Fresnel lens which comprises a glass plate, a Fresnel lens body integrally formed by a photo-curing resin on one surface of the glass plate, and a reflective layer formed by sputtering of a metal on an annularly grooved surface of the lens body.

Another object of the present invention is to provide a Fresnel lens which comprises a glass plate, a Fresnel lens body integrally formed by a thermosetting resin on one surface of the glass plate, and a reflective layer formed by sputtering of a metal on an annularly grooved surface of the lens body.

A further object of the present invention is to provide a Fresnel lens which comprises a glass plate, a Fresnel lens body integrally formed by a synthetic resin on one surface of the glass plate, a reflective layer formed by sputtering of a metal on an annularly grooved surface of the lens body, and a glass plate attached on the reflective layer.

A still further object of the present invention is to provide a Fresnel lens which comprises a Fresnel lens body of a synthetic resin, a reflective layer formed on a non-spherical surface of the lens body, and a glass plate attached on the reflective layer.

An object of the present invention is to provide a Fresnel lens, in which no hard coating is required since the glass plate itself can be utilized as a document support to reduce the process steps for producing Fresnel lenses. The glass plate, which is harder than the conventional hard coating, will not be scratched when it is used as a document support.

A still further object of the present invention is to provide a Fresnel lens, which will not produce any ghost image (double image), when used in a projector using a glass plate, having a higher index of refraction than that of any synthetic resins.

The invention provides a curling-free Fresnel lens which will not produce any distortion in the projected image, when used in a projector.

An object of the present invention is to provide a Fresnel lens, in which a glass plate is attached to the lens body of a synthetic resin to prevent deformation of the lens body.

DETAILED DESCRIPTION OF THE PREFERRED EMBODIMENTS

The preferred embodiments of the invention will now be described with reference to the accompanying drawings.

Figure 1:
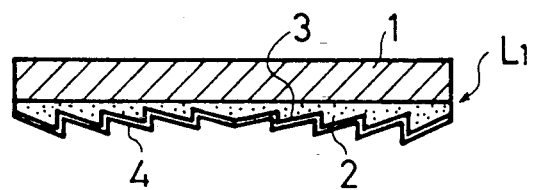
FIG. 1 is a sectional view of an embodiment of a Fresnel lens according to the present invention.

FIG. 1 shows an embodiment of a Fresnel lens $L_1$, in which a reflective layer 4 by sputtering of aluminum is formed on an annularly grooved surface 3 of a Fresnel lens body 2, which is integrally formed on one surface of a glass plate 1.

The process of forming the Fresnel lens comprises the following steps.

Figure 2:
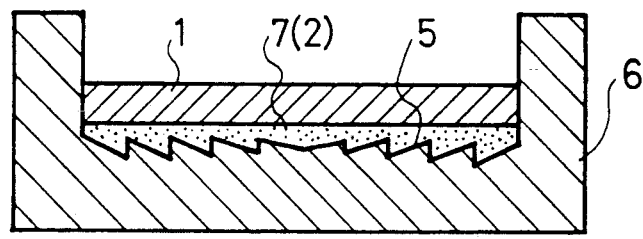
FIG. 2 shows a process of making the lens of FIG. 1.

(1) As shown in FIG. 2, the Fresnel lens press mold 6 has a transfer surface 5 for forming an annularly grooved surface 3 of the Fresnel lens $L_1$, which is to be finally obtained. A photo-curing resin 7 is applied on the transfer surface 5 of the press mold 6. The thickness of the photo-curing resin 7, which is 180 micron meter in the embodiment, is actually applicable within the range of 160 to 200 micron meter.

A glass plate 1 having a thickness of 0.7 mm is then placed on the already applied resin layer 7. The applicable range of thickness is 0.5 to 1.0 mm. An ultraviolet ray is then illuminated on photo-curing resin layer 7 to harden the layer to form the Fresnel lens body 2 which is integral with glass plate 1. The glass plate with lens body 2 is separated from the mold 6. On the annularly grooved surface 3, aluminum is sputtered to form the reflective layer 4.

Advantages of the resulting Fresnel lens $L_1$ are as follows:

The glass plate 1 of lens $L_1$ is used as a document support of a projector. Hard coating which was conventionally indispensable is therefore unnecessary, thereby reducing process of making Fresnel lens $L_1$. Further, glass plate 1, which is higher in hardness than that of the conventional hard coating layer, is free from any scratches, even when subjected to a long time use as the support.

As another advantage, the lens $L_1$ will not produce any ghost image or a double image, because the glass plate 1 is of higher refractive index than the resin as material of the conventional Fresnel lens.

Lens body 2 integrally formed with glass plate 1 is subjected to sputtering on its annularly grooved surface 3 in a vacuum chamber, and is formed of a photo-curing resin, which can expand when freed from the chamber to the air. But such expansion is sustained by the hard glass plate 1 to prevent curling of lens body 2. When the Fresnel lens $L_1$ formed as above is used in a projector, the projected image is free from any distortion.

EXAMPLE 2

Figure 3:
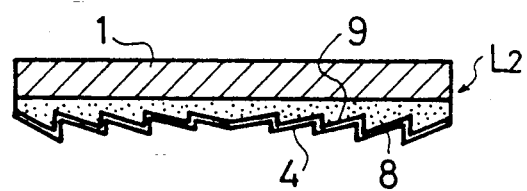
FIG. 3 is a sectional view of another embodiment of a Fresnel lens.

FIG. 3 shows the second embodiment of the invention, in which Fresnel lens $L_2$ is provided with a reflective layer 4 of aluminum, formed by sputtering on the annularly grooved surface of lens body 8, which is integrally formed of a thermosetting resin on one surface of the lens body 8.

In comparison with the first embodiment, the process for forming the lens $L_2$ is different in that a thermosetting resin is used instead of photo-curing resin used in the first embodiment. In other points, the embodiment is similar to the first embodiment.

EXAMPLE 3

Figure 4:
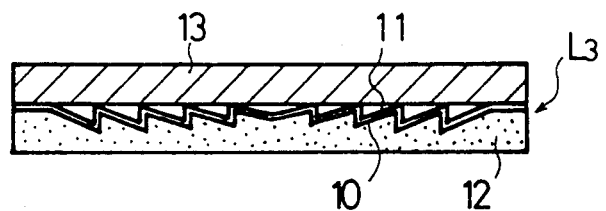
FIG. 4 is a sectional view of the third embodiment of a Fresnel lens.
Figure 5:
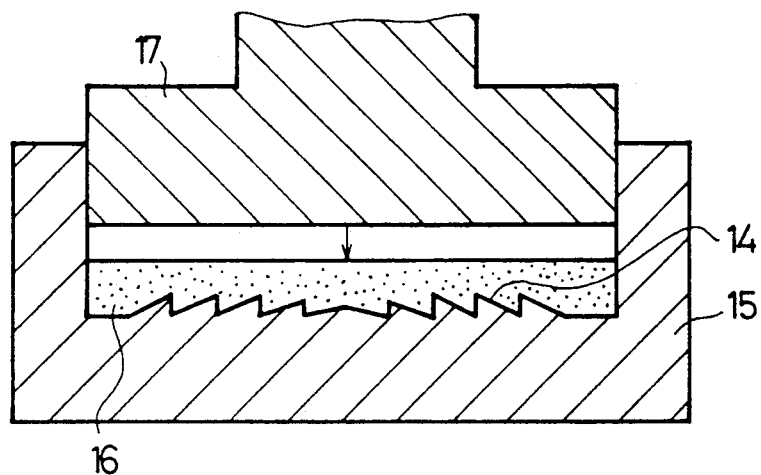
FIG. 5 shows a process of making the lens of FIG. 4.

FIG. 4 shows the third embodiment of the invention. The Fresnel lens $L_3$ comprises a lens body 12 of a thermosetting resin, a reflective layer of aluminum sputtered on the annularly grooved surface 11, and a glass plate 13 attached on the reflective layer 11.

The process for fabricating the lens $L_3$ is as follows.

A plate-like material 16 of a thermosetting resin, which is 1.0 mm in thickness, is placed within a press mold 15 having a transfer surface 14 for forming an annularly grooved surface 10 of the lens $L_3$.

The resin plate 16 is softened by heating. Then the top mold 17 is moved down to press the resin plate 16.

After cooled, lens body 12 is freed from the mold 15. Aluminum is sputtered on the annularly grooved surface 10 to form a reflective surface 11. Finally, glass plate 13 is attached on the reflective layer with its annular fringe area of the lens body 12.

The glass plate 12 itself of Fresnel lens $L_3$ can be used as a document support of the projector, so that the conventionally applied hard coating is unnecessary, and reduce the steps of manufacturing process. The glass plate 13, whose hardness is higher than that of the conventional coating, is free from being scratched even when employed for a long time.

The value of index of refraction of glass plate 13, which is higher than that of resin as material of the lens, enables to avoid occurance of ghost images (double images), when employed in a projector.

In addition, even though expanded by absorbing humidity when freed from the vacuum chamber to the atmosphere, lens body 12 is prevented from curling by rigidity of the attached glass plate 13.

As Fresnel lens $L_3$ is of reflective type, the light will not go through lens body 12, the curling of which is sufficiently prevented by increasing thickness thereof. No distortion can be produced in the projected images when employed in a projector.

EXAMPLE 4

Figure 6:
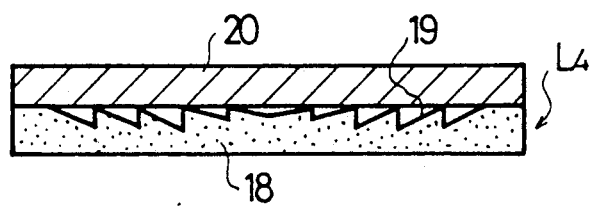
FIG. 6 is a sectional view of the fourth embodiment of a Fresnel lens.

The fourth embodiment is shown in FIG. 6. The Fresnel lens $L_4$ comprises a lens body 18 of a thermosetting resin, and a glass plate 20 attached on the annularly grooved surface 19 of lens body 18.

The process for making lens $L_4$ is similar but different from the third embodiment in directly attaching glass plate 20 to lens body 18 without providing a reflective layer 11 of the third embodiment.

The process of sputtering is missing for forming the lens body of the embodiment. Therefore, lens body 18 is free from expansion due to absorbing humidity. A possible deformation owing to absorption and desorption of humidity is restricted by the attached glass plate 20.

The glass plate 20 may be also attached to the surface opposite to the annularly grooved surface of lens body 18.

EXAMPLE 5

Figure 7:
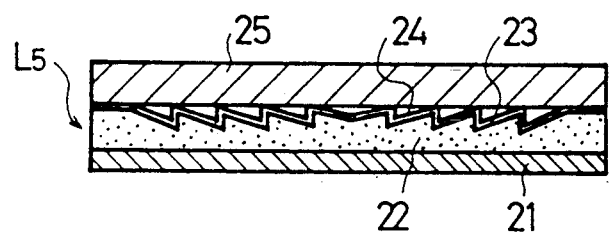
FIG. 7 is a sectional view of the fifth embodiment of a Fresnel lens.

The fifth embodiment is shown in FIG. 7. As shown, the Fresnel lens $L_5$ includes: an annularly grooved surface 23 of the Fresnel lens body 22, which is integrally formed on one surface of an aluminum plate 21; a reflective layer 24 of aluminum formed on the annularly grooved surface 23 by sputtering; and a glass plate 25 attached to lens body 22 on its reflective layer 24.

Figure 8:
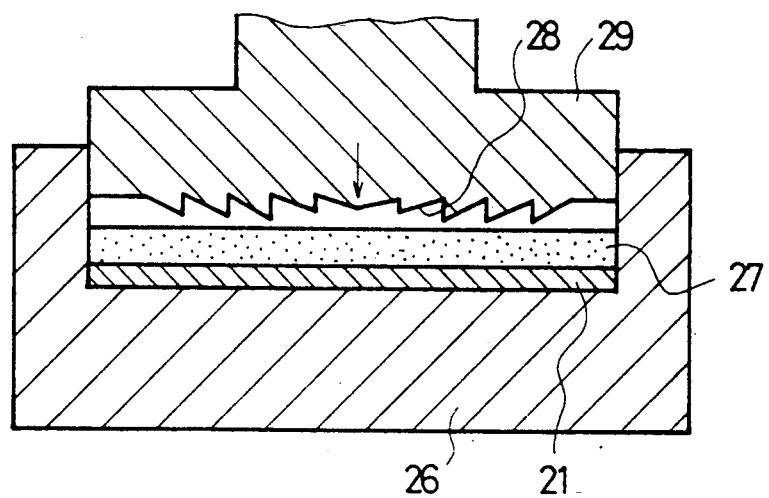
FIG. 8 shows a process of making the lens of FIG. 7.
Figure 9:
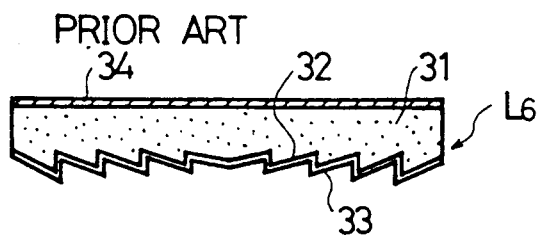
FIG. 9 is a sectional view of a conventional Fresnel lens.
Figure 10:
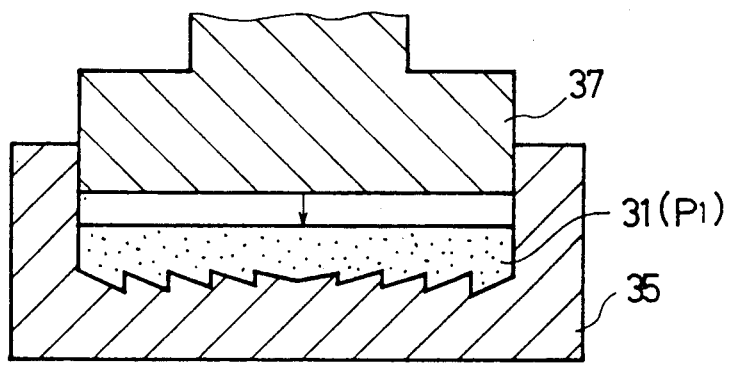
FIG. 10 shows a process of making the lens of FIG. 9.
Figure 11:
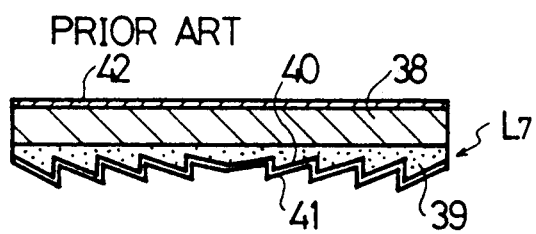
FIG. 11 is a sectional view of another conventional Fresnel lens.
Figure 12:
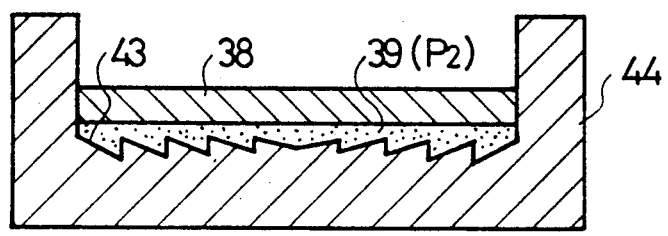
FIG. 12 shows a process of making the lens of FIG. 11.

As shown in FIG. 8, the steps for fabricating Fresnel lens $L_5$ include:
(1) setting an aluminum plate 21 in the lower mold 26, and a thermo-setting resin plate 27 of 1.0 mm in thickness thereon, which is heated until being softened;
(2) lowering the Fresnel mold (the upper mold) 29 for forming the resin plate 27 by pressing;
(3) after cooled, taking out a formed lens body 22 from the Fresnel mold 29, on the annularly grooved surface 23 of which a reflective layer 24 of aluminum is formed by sputtering; and finally
(4) a glass plate 25 is attached on the reflective layer 24 with its annular fringe area adhered to glass plate 25.

What is claimed is:
1. A Fresnel lens comprising:

a lens body of a synthetic resin having a flat surface and an annularly grooved surface; and a glass plate attached to said lens body so as to directly face said annularly grooved surface.

2. A Fresnel lens according to claim 1 further comprising:

a reflective layer on said annularly grooved surface formed of a sputtered metal, so said glass plate attached to said lens body directly faces said reflective layer.

3. A Fresnel lens according to claim 2, wherein said synthetic resin is a thermosetting resin.

4. A Fresnel lens according to claim 1, wherein said synthetic resin is a thermosetting resin.

5. A Fresnel lens of claim 1, wherein said glass plate has a thickness of from about 0.5 millimeters to about 1 millimeter.

6. A Fresnel lens of claim 5, wherein said synthetic resin has a thickness of about 1 millimeter.

7. A Fresnel lens comprising:

an aluminum plate;

a lens body of a synthetic resin having its flat surface attached to one surface of said aluminum plate;

a reflective layer formed of a sputtered metal on an annularly grooved surface of said lens body; and a glass plate attached to said lens body so as to directly face said annularly grooved surface.

8. A Fresnel lens according to claim 7, wherein said synthetic resin is a thermosetting resin.

9. A Fresnel lens of claim 7, wherein said glass plate has a thickness of from about 0.5 millimeters to about 1 millimeter.

10. A Fresenl lens of claim 9, wherein said synthetic resin has a thickness of about 1 millimeter.

* * * * *